United States Patent [19]

Hussey et al.

[11] Patent Number: 5,784,102
[45] Date of Patent: Jul. 21, 1998

[54] OPTICAL READER HAVING IMPROVED INTERACTIVE IMAGE SENSING AND CONTROL CIRCUITRY

[75] Inventors: Rob Hussey, Liverpool; William H. Havens, Skaneateles; Robert J. Wood, Sr., Syracuse, all of N.Y.

[73] Assignee: Welch Allyn, Inc., Skaneateles Falls, N.Y.

[21] Appl. No.: 807,066

[22] Filed: Feb. 27, 1997

Related U.S. Application Data

[63] Continuation of Ser. No. 441,447, May 15, 1995, abandoned.

[51] Int. Cl.⁶ .............................. H04N 3/14; H04N 5/335
[52] U.S. Cl. ....................... 348/296; 348/311; 235/472
[58] Field of Search ........................... 235/462, 472; 348/296, 311, 362, 363, 364

[56] References Cited

U.S. PATENT DOCUMENTS

| | | |
|---|---|---|
| 4,210,802 | 7/1980 | Sakai . |
| 4,315,245 | 2/1982 | Nakahara et al. . |
| 4,488,678 | 12/1984 | Hara et al. ............... 235/463 |
| 4,488,679 | 12/1984 | Bockholt et al. . |
| 4,500,776 | 2/1985 | Laser ........................ 235/162 |
| 4,538,060 | 8/1985 | Sakai et al. ............... 235/472 |
| 4,610,359 | 9/1986 | Muller ....................... 209/3.1 |
| 4,757,057 | 7/1988 | Chadima et al. . |
| 5,153,421 | 10/1992 | Tandon et al. ............ 250/208.1 |
| 5,331,176 | 7/1994 | Sant' Anselmo et al. . |
| 5,378,883 | 1/1995 | Batterman et al. ........ 235/472 |

FOREIGN PATENT DOCUMENTS

| | | |
|---|---|---|
| 53-76047 | 6/1978 | Japan . |
| 9304442 | 3/1993 | WIPO . |
| 9318478 | 9/1993 | WIPO . |

OTHER PUBLICATIONS

VLSI Vision, Ltd. (VVL) "VVL 1070 Engineering Evaluation Kit" pp. 1-5, 1994.

Marshall Electronics, Inc. "Monochrome Monolithic Image Sensor with Analogue and Digital Outputs". pp. 1-24, 1994.

*Primary Examiner*—Andrew I. Faile
*Assistant Examiner*—Christopher Onuaku
*Attorney, Agent, or Firm*—Wall Marjama & Bilinski

[57] ABSTRACT

A hand-held optical reader for reading 2D bar code symbols. The reader includes an illuminating system for illuminating the symbol and an optical system for focusing an image thereof on a 2D image sensor. The image sensor is of the type which allows its imaging parameters, such as exposure, to be controlled by external circuitry. The reader also includes an image sensor processor which sets and changes the imaging parameters used by the image sensor as necessary to meet predetermined image quality criteria and to reduce the time necessary to complete a read operation.

16 Claims, 4 Drawing Sheets

OPTICAL READER HAVING IMPROVED INTERACTIVE IMAGE SENSING AND CONTROL CIRCUITRY

CROSS REFERENCES TO RELATED APPLICATIONS

This is a continuation of U.S. patent application Ser. No. 08/441,447, filed May 15, 1995, now abandoned.

BACKGROUND OF THE INVENTION

The present invention relates to hand-held optical readers, and is directed more particularly to a hand-held optical reader having improved circuitry for controlling the imaging parameters of the reader in accordance with the requirements of a stored program.

Prior to the present invention many optical readers were designed which were able to deal with the problem of reading one dimensional (1D) bar code symbols. At one extreme these included optical readers which were relatively simple and inexpensive to manufacture, but which operated under relatively narrowly defined operating conditions. At the other extreme these included optical readers which were able to operate under relatively broadly defined operating conditions, but which were relatively complex and expensive to manufacture. Examples of patents which disclose 1D optical readers which fall between these extremes include U.S. Pat. Nos. 4,538,060 (Sakai et al) and 4,734,566 (Senda et al).

The difficulties of designing and manufacturing optical bar code readers were greatly increased by the introduction of two dimensional (2D) bar code symbols. This is because the reading of 2D bar code symbols is much more difficult and time consuming than the reading of one dimensional (1D) bar code symbols. One reason is the greater area over which acceptable illumination must be maintained. Another reason is the greater difficulty of forming a usable image of the larger symbol and reading more densely packed data therefrom as described, for example, in U.S. Pat. No. 5,378,883 (Batterman et al). Still another reason is that 2D bar code symbols require the use of more complex and time consuming decoding algorithms such as that described, for example, in U.S. Pat. No. 4,896,029 (Chandler et al) or the use of relatively complex processing circuitry such as that described, for example, in U.S. Pat. No. 4,488,679 (Bockholt et al).

Thus, a need has existed and does exist for a new 2D optical reader which is able to deal with the complexities of reading 2D bar codes, and yet which is simple in design and inexpensive to manufacture.

SUMMARY OF THE INVENTION

In accordance with the invention there is provided a hand-held optical reader including a single-chip image sensor which allows the imaging parameters, such as exposure, frame size, etc. thereof to be controlled by external control circuitry, and a single-chip image sensor controller or control processor for controlling that image sensor in accordance with a stored program that changes those imaging parameters as necessary to increase the speed and accuracy of at least the preliminary or acquisition phase of the reading process. As a result of this cooperative interaction, the reader is able to complete the image acquisition phase of the reading process relatively rapidly and to devote more time to the decoding phase of the reading process without noticeably increasing the duration of the reading process as a whole.

Generally speaking, the reader of the invention includes a handheld housing containing an illumination system for directing light against the indicia to be read and an optical system for receiving light reflected from that indicia. The reader of the invention also includes an image sensor subsystem, preferably in the form of a single monolithic integrated circuit chip, which generates an image data signal based on image information received from the optical system, using externally supplied imaging parameters. Finally, the reader of the invention includes an image sensor control subsystem, preferably including a microprocessor for controlling the imaging parameters used by the image sensor in accordance with a stored program that is designed to cause the image sensor to produce high quality image data in a relatively short time. Using the same or a different stored program, the microprocessor decodes this image data to provide high quality alphanumeric data to an external data utilization device. By working cooperatively and interactively in a master-slave relationship, the sensor control subsystem and the image sensor subsystem improve both the speed and the accuracy of the reading process as a whole.

In a first embodiment of the invention, the imaging sensor comprises an integrated circuit having imaging control inputs through which it receives from the microprocessor imaging control signals that set the exposure and/or the gain values to be used thereby. (In this embodiment, neither the dimensions of the frame nor the frame rate at which image data is read is changed during a read operation). The microprocessor then evaluates the resulting image data against criteria stored in its program and makes additional adjustments to the exposure and/or gain as necessary until the image data indicates that the stored criteria are met. The microprocessor then decodes the known acceptable image data and provides the same to an external data utilization device. Under some circumstances, the microprocessor may be able to abort a read as soon as it determines that its stored criteria will not be met. In such cases, the microprocessor may be able to complete its adjustment activities sooner than it otherwise would, and to devote the time saved to better performing the decoding and error checking phases of the reading process.

In a second, more powerful embodiment of the invention, the image sensor comprises an integrated circuit which is generally similar to that of the first embodiment, except that it includes imaging control inputs that allow the microprocessor to control not only the exposure and/or gain values used thereby, but also parameters such as the frame size and frame format (interlaced vs non-interlaced) used thereby. In this embodiment of the invention, the setting of the imaging parameters of the image sensor is accomplished by performing an accelerated preliminary read operation, using a small frame size and an interlaced format to determine acceptable exposure and gain values, and then communicating necessary changes in these values to the image sensor. Once this has been accomplished, the microprocessor outputs control signals which cause the image sensor to use a larger frame size and an non-interlaced format so that the final read operation, i.e., the reading of data upon which decoding and error correction will be performed takes place with a higher resolution than the preliminary read operation. Thus, by controlling the imaging parameters of the image sensor, the microprocessor is able to both decrease the acquisition time of the reader and increase the resolution thereof. In view of the foregoing, it will be seen that the circuitry of the invention allows the resources of the reader as a whole to be reorganized and redirected as necessary to produce data with improved accuracy in a shorter period of time.

DESCRIPTION OF THE DRAWINGS

Other object and advantages of the invention will be apparent from the following description and drawings in which.

DESCRIPTION OF THE PREFERRED EMBODIMENTS

Figures 1, 1A:
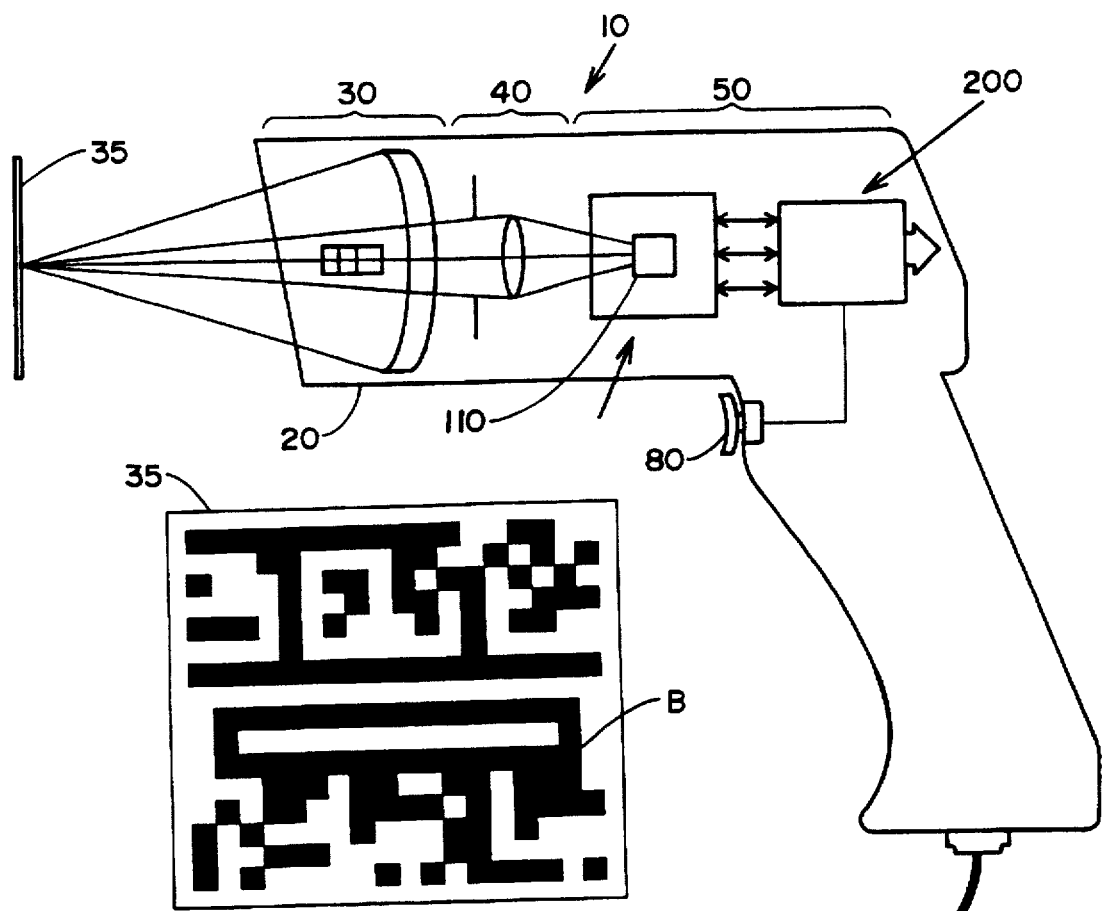
FIG. 1 is a simplified diagrammatic view of one embodiment of a bar code reader suitable for use in practicing the present invention.
FIG. 1A shows one type of 2D bar code symbol which can be read by the reader of the invention.

Referring to FIG. 1 there is shown a simplified diagrammatic side view of one type of bar code reader 10 that is suitable for use in practicing the present invention. Generally speaking, bar code reader 10 includes a hand-held housing 20 that includes an illuminating system 30 which directs light in illuminating relationship to a bar code symbol appearing on a label or other symbol bearing surface 35. Reader 10 also includes an optical system 40 which receives light scattered from the bar code symbol and focuses that light as an image on read circuitry 50. The latter circuitry, receives this image, converts it into a readable set of electrical signals, and then converts those signals into alphanumeric data which may be transmitted to a data utilization device 60 via a suitable cable 70.

One example of such a bar code symbol is the two dimensional (2D) bar code symbol B shown in FIG. 1A. This bar code symbol encodes data according to a 2D bar code symbology known as Code One. A number of other 2D bar code symbologies, such as MaxiCode, QR Code, etc. also exist. It will be understood that the present invention is not limited to use with any particular one of these symbologies or to 2D symbologies in general. It may, for example, also be used with various OCR symbologies. This is because the differences between these symbologies are taken into account by differences in the decoding algorithms used by the read circuitry and by differences in the magnifications of the optical systems used with symbols of different sizes.

Figure 2:
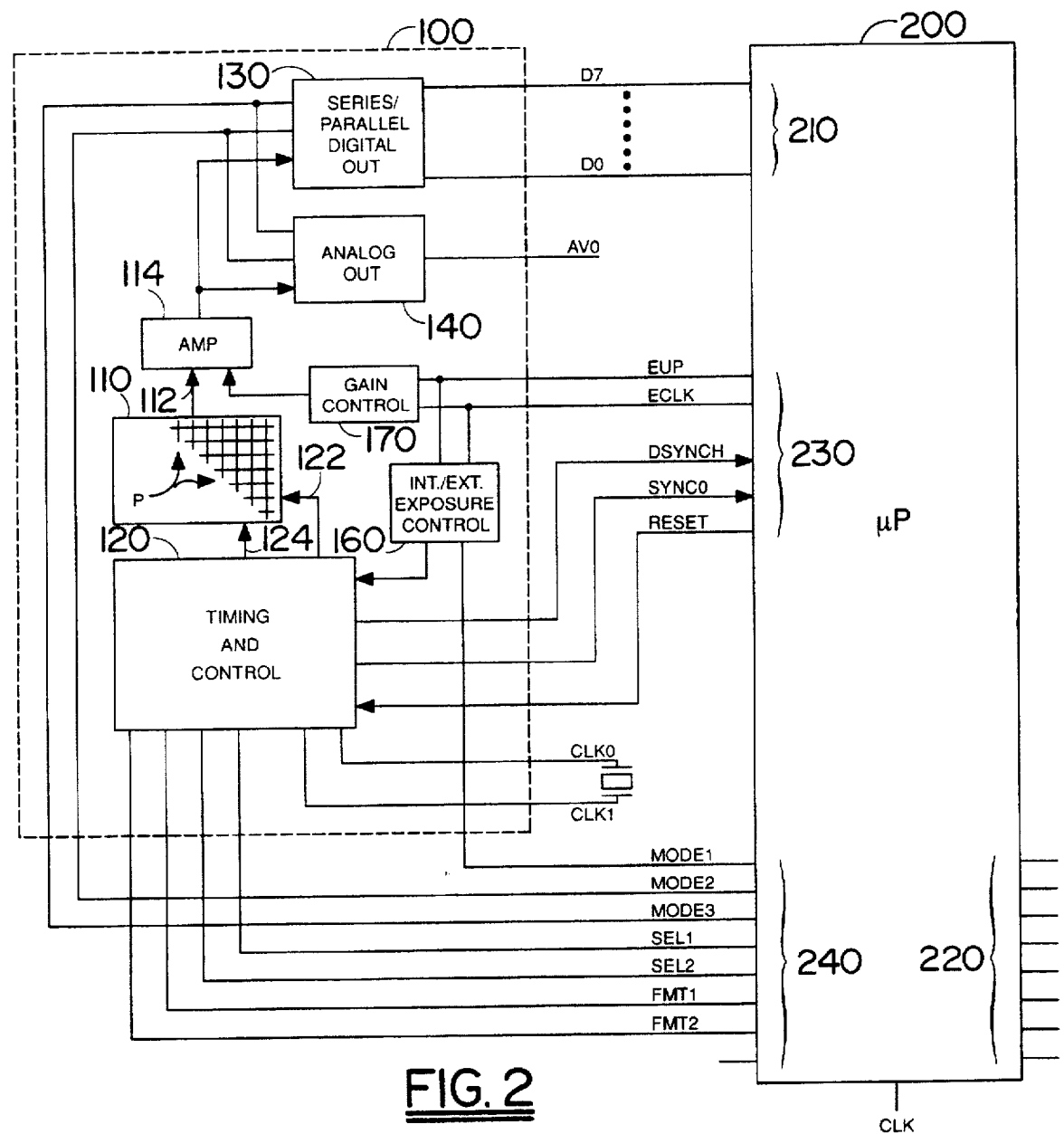
FIG. 2 is a simplified block-schematic diagram of an image sensor circuit suitable for use in the embodiment of FIG. 1. together with an image sensor control processor for controlling the operation thereof in accordance with a stored program.

In accordance with the present invention, read circuitry 50 includes two cooperating interactive subsystems, each of which comprises a circuitry that, preferably is formed as a single monolithic integrated circuit chip. More particularly, as shown in FIGS. 1 and 2. read circuitry 50 includes an image sensing subsystem or sensor 100 having a 2D light sensitive region 110 upon which optical system 40 may focus an image of bar code symbol B. Read circuitry 50 also includes an image sensor control subsystem or controller 200, preferably comprising a microprocessor, for controlling the operation of image sensor 100 in accordance with a stored program, based in part on image data received from sensor 100. Advantageously, microprocessor 200 can cause the imaging parameters used by image sensor 100 to take on new values specified by the stored program. This, in turn, gives controller 200 the power to force image sensor 100 to operate in conformity with the requirements of the program and to meet image quality criteria specified thereby.

In the preferred embodiment microprocessor 200 uses this power to speed up and otherwise optimize the completion of preliminary or acquisition phase of the reading process, and then, with or without further changes in imaging parameters optimize the final read and decoding the phases thereof. Thus, the two subsystems of reader circuit 50 work together cooperatively and interactively to achieve the improved results contemplated by the present invention.

The manner in which image sensor and microprocessor cooperate to achieve the above-described result will now be discussed with reference to the schematic-block diagram of FIG. 2 and the flow chart of FIG. 3. In the embodiment of FIG. 2 the image sensor preferably comprises an integrated circuit or chip 100 which may, for example, be a monochrome monolithic image sensor of the type sold by VLSI Vision Limited under the model designation VVL 1070. Sensor 100 includes, on a single substrate a two dimensional array 110 of light sensitive picture elements or pixels P upon which optical system 40 is arranged to focus an image of bar code symbol B. Sensor 100 also includes a timing and control circuit 120 for electrically addressing pixels P via horizontal and vertical address lines 122 and 124, respectively, and thereby causing electrical signals representing the image to be read out of array 110 via output 112 thereof. After amplification by an amplifier 114, and further processing the latter signals are output from chip 100 as one of (i) a digital parallel image data signal on data output lines D0–D7. (ii) a digital serial image data signal on data lines D0–D1, or (iii) an analog output voltage on analog image data output AVO. The chip circuitry responsible for the production of these digital and analog image data signals is represented in FIG. 2 as series/parallel digital output network 130 and analog output network 140, respectively. Digital image data is supplied from sensor 100 to processor 200 with the aid of a signal SYNCO, which serves as a frame start pulse, and a signal DSYNC, which serves as a data valid pulse. Because the use of such signals is known to those skilled in the art, their use will not be described in detail herein.

In the embodiment of FIG. 2, image sensor control processor preferably comprises a microprocessor 200 which may be of either the single chip or multi-chip types, and which may include on chip and/or of chip program and data (working) memories, depending upon the complexity of the program used to control image sensor 100 and to decode image data produced thereby. For purposes of the exemplary embodiment of FIG. 2, microprocessor 200 is of the type which is formed on a single integrated circuit chip and which includes an on-chip read only program memory 202 and an on-chip read-write working memory 204. Microprocessor 200 is also of the type which includes four eight-bit input-output (I/O) ports, 210 through 240, each bit of each port being independently controllable by the stored program. Because microprocessors of this type, and their multi-chip equivalents are well-known to those skilled in the art, microprocessor 200 will not be described in detail herein in its commercially available form, makes provision for many of its imaging parameters to be controlled by the user. If a user does not wish to specify parameters such as the clock rate, he can use the nominal or manufacturer suggested clock rate by connecting a 12 Mhz crystal across chip input pins CLK0 and CLK1. A user may also change this clock rate by changing the number (divisor) used to divide the nominal clock rate via select lines SEL1 and SEL2, in accordance with Table 1 hereof.

TABLE 1

| SEL1 | SEL2 | Clock Rate Divisor | Internal Clock Rate |
| --- | --- | --- | --- |
| 0 | 0 | 2 | 6 mhz |
| 1 | 0 | 4 | 3 mhz |
| 0 | 1 | 8 | 1.5 mhz |
| 1 | 1 | 16 | .75 mhz |

If, on the other hand, a user wishes to use a special purpose clock rate, he may do so by connecting a clock signal of the desired frequency to chip input CLK1. A user who decides to take advantage of the ability of sensor 100 to operate at various clock rates will implement his decision by connecting or not connecting a bridging or linking wire across pairs of metal pads connected in series with the SEL1 AND SEL2 lines, such pairs of pads being represented by pairs of small squares in FIG. 2.

Similarly, a user may specify the mode in which sensor 100 outputs image data by connecting or not connecting bridging wires across pairs of metal pads connected to the MODE 2 and MODE 3 control inputs thereof in accordance with Table 2 hereof.

TABLE 2

| MODE 2 | MODE 3 | Data Output Mode |
| --- | --- | --- |
| 0 | 0 | Digital Mode Parallel |
| 1 | 0 | Digital Mode Serial |
| X | 1 | Analog |

In addition, a user may specify the size or dimensions of the frame of data to be read from array 110 by connecting or not connecting bridging wires across pairs of metal pads connected to the FMT1 and FMT2 control inputs of sensor 100 in accordance with Table 3 hereof.

TABLE 3

| FMT1 | FMT2 | Rows | Columns |
| --- | --- | --- | --- |
| 0 | 0 | 120 | 160 |
| 1 | 0 | 160 | 120 |
| 0 | 1 | 120 | 120 |
| 1 | 1 | 160 | 160 |

Furthermore, a user may specify whether the exposure time of the pixels of the array is to be controlled internally or externally. In the internal exposure control mode, used by sensor 100 when a conductor bridges a pair of metal pads connected to the MODE 1 control input thereof, the exposure time of the pixels of array 110 is controlled by an on chip exposure control network 160 which operates through timing and control circuit 120. In the external exposure control mode, used when no conductor bridges the last mentioned pair of metal pads, the exposure time of the pixels of array 110 is controlled via externally generated pulses received through control input EUP in conjunction with a clock signal received through control input ECLK.

The particular image sensor chip shown in FIG. 2 also provides for external control of the gain used thereby, i.e., the gain which amplifier 114 applies to the output signal of array 110. In the embodiment of FIG. 2 this external gain control is exerted via the same signals EUP and ECLK which control the exposure used by the chip. The circuitry which exerts this control is represented in FIG. 2 as a gain control circuit 170. In operation, signals EUP and ECLK are used to increment the exposure value, by a factor of 6.25% per increment, until that value reaches its maximum value. Once this maximum value is reached, further EUP and ECLK signals are used to increase the gain provided by amplifier 114. It will be understood that this coupling of the exposure and gain controls is inherent in the VVL 1070 image sensor shown in FIG. 2, and bears no necessary relationship to the practice of the present invention. In general, the present invention contemplates gain and exposure parameters which may be controlled independently of one another.

In accordance with an important feature of the present invention, the various above-described wire-selectable operating modes of sensor 100 100 are made signal or state selectable and are placed under the control of imaging microprocessor 200 and the program stored therein. This, in turn, allows microprocessor 200 to change the imaging parameters of the image sensor as necessary to conform the imaging activity thereof to the requirements of each phase of the reading process. Stated differently, this causes the image sensor to bear a master/slave relationship to the microprocessor, and to operate in lock-step with the requirements of the program executed thereby.

The above-mentioned control is achieved by taking advantage of the fact that the effect of connection or non-connection of a programming wire can be simulated by the two states of an open-collector control line that is connected to a suitable pull up resistor. Specifically, the high or one state of such a control line corresponds to the unbridged state of a pair of input pads while the low or 0 state thereof corresponds to the bridged state of that pair of input pads. As a result, the imaging circuit operates as before, but under the control of the microprocessor and its program.

In the illustrative embodiment of FIG. 2, the control which microprocessor 200 exerts over image sensor 100, and the image data received therefrom, are apportioned among the I/O ports thereof as will now be described. Firstly, parallel digital data from data outputs D0–D7 of chip 100, or serial digital data from data outputs D0–D1 thereof, are coupled to an 8 bit I/O port 210 of microprocessor 200. After data from a complete image is received and decoded, the decoded alphanumeric data is output to an external data utilization device, such as a terminal, through 8 bit I/O port 220. Those imaging control signals which pass between the image sensor and microprocessor as pulses which occur relatively frequently during the reading process are grouped together and connected to I/O port 230. Those imaging control signals which are transmitted from the microprocessor to the image sensor and which occur relatively infrequently during the reading process are grouped together and connected to I/O port 240.

The particular combination of imaging control signals that microprocessor 200 transmits to image sensor 100, and the times at which the imaging control signals are transmitted or changed, depends upon the overall read strategy of reader 10, as embodied in the program of microprocessor 200. One illustrative example of such a strategy, and of its implementation by the present invention, will now be described with reference to the flow chart of FIG. 3.

Figure 3:
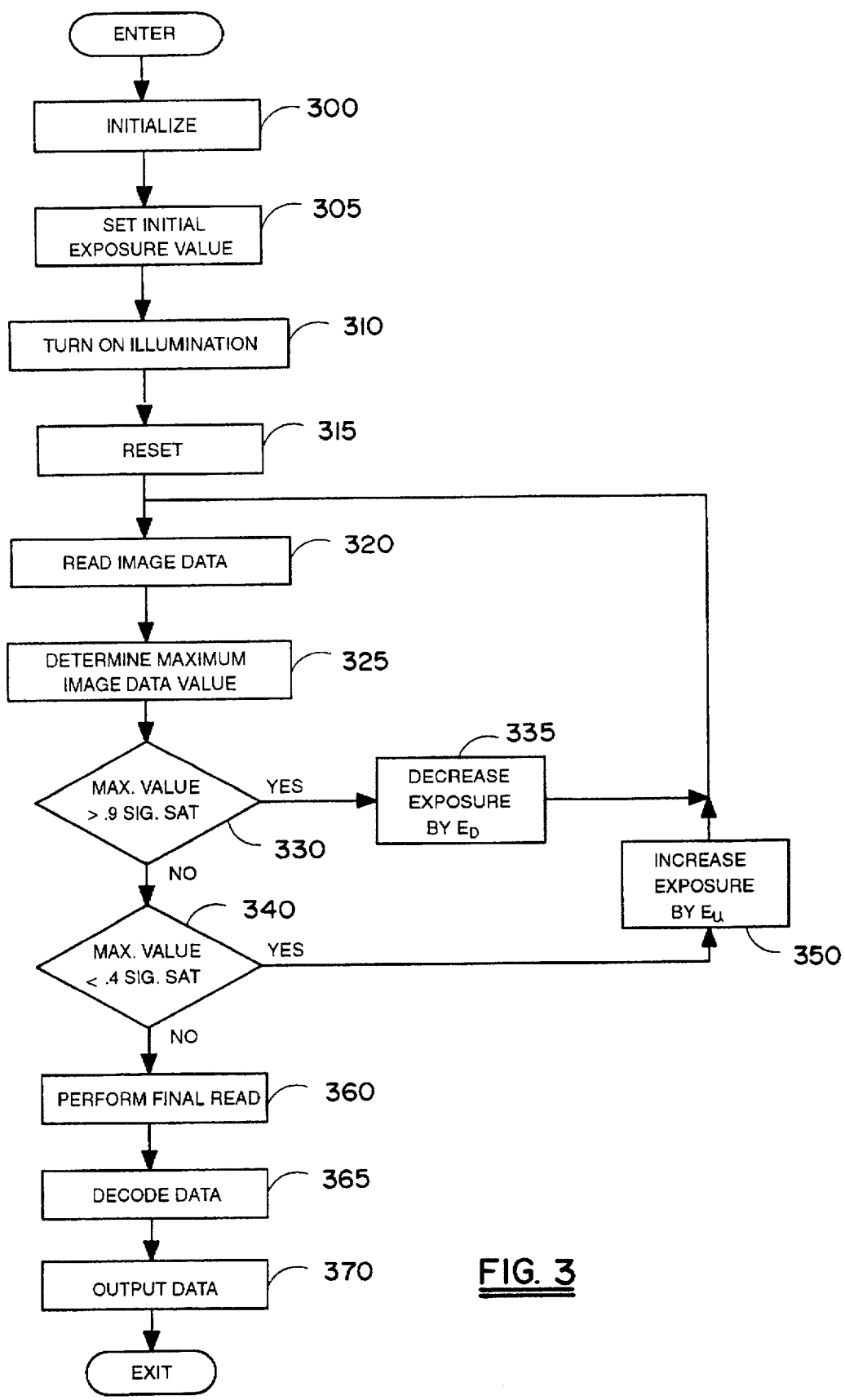
FIG. 3 is a flow chart illustrating the operation of one part of the stored program of the control processor of FIG. 2.
Figure 4:
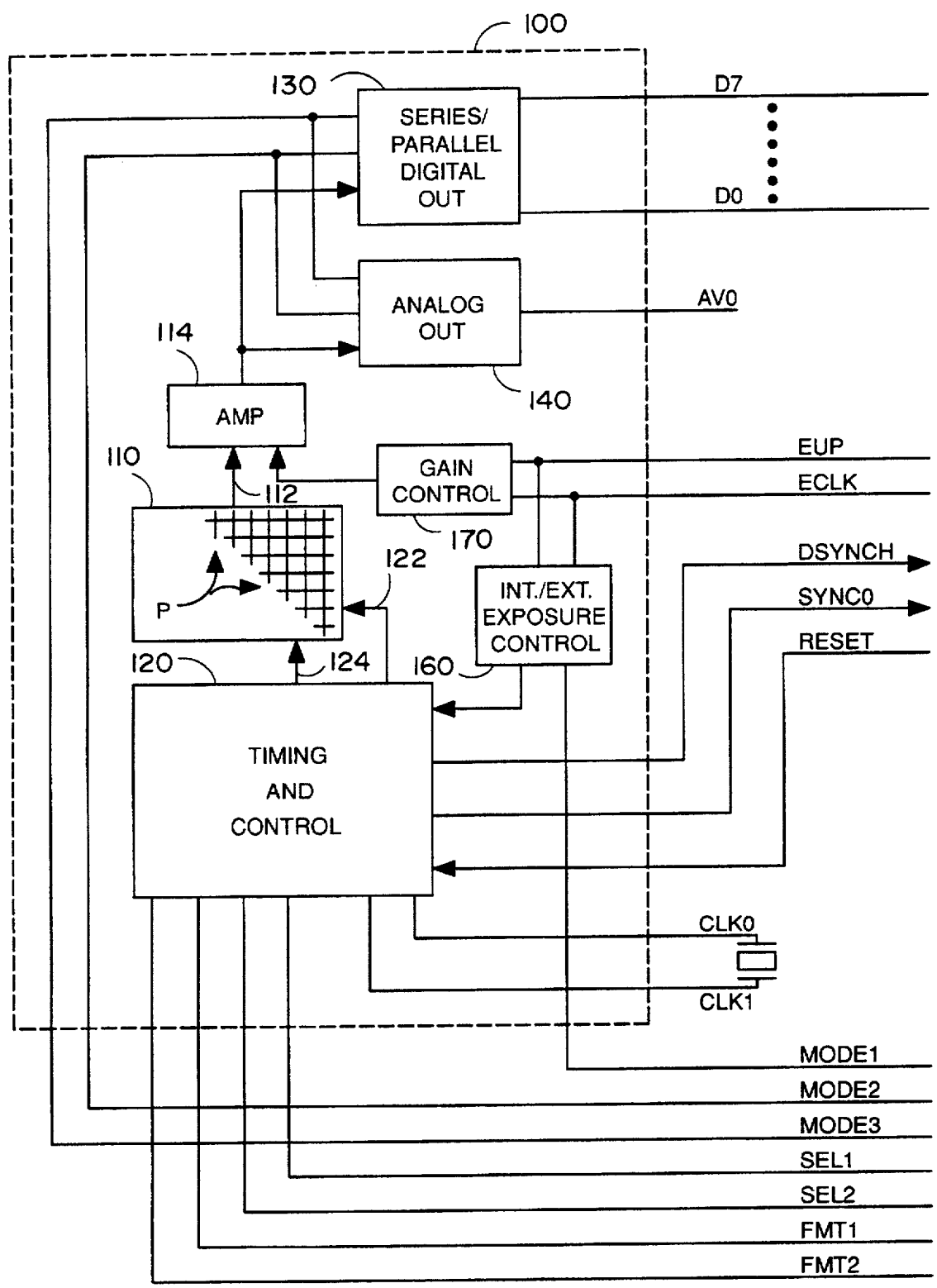
FIG. 4 is a simplified block-schematic diagram of the image sensor circuit of FIG. 2.

Referring to FIG. 3 there is shown a flow chart for a reader having a microprocessor that is programmed to improve the accuracy of a read operation by making certain that the exposure value used by image sensor 100 is such that the maximum value of the image data signal meets magnitude criteria specified in the program thereof. More particularly, the exposure value is to be set, in the shortest possible time, to a value such that the maximum image data output signal magnitude is between 40% and 90% of the maximum or saturation value thereof. Such a value is advantageous because it avoids both the data loss that results from overexposure of array 110 and the poor signal-to-noise ratio that results from underexposure thereof.

Assuming that the reader had just been turned on, the program will begin by initializing the image sensor pursuant to block 300. This initialization will include, for example, the outputting from I/O port 240 of an imaging control word in which the mode 1 control signal is a 0, indicating that external exposure control is to be used and the mode 2 and mode 3 control signals are 0 and 0, indicating that image data is to be output in the digital mode in parallel. This initialization may also include the outputting of SEL1 and SEL2 control signals specifying the desired clock divisor (and consequently the desired frame rate) and FMT1 and FMT2 control signals specifying the desired image format. With the WL 1070 image sensor the frame rate is so linked to the image format that the time necessary to read a frame is constant. As a result, these four signals may be set to zero, causing the image sensor to operate with a 12 frames per second frame rate and a 120×160 image format. It will be understood, however, that, in general, both the SEL and FMT signals will be initialized to those independent values that allow the desired exposure setting to be achieved most rapidly.

Once the above-described initialization has been completed, microprocessor 200 proceeds to block 305, and sets the initial exposure value to be used by image sensor 100. In the case of the VVL 1070 image sensor, this block may be skipped if the exposure is allowed to assume its on-chip default value, which is equal its maximum value. Once this has occurred, processor 200 turns on the light sources of illumination system 30, as called for by block 310, and resets sensor 100 to the start of a frame via the RESET line of I/O port 230, as called for by block 315. As sensor 100 outputs image data under the control of timing and control network 120, processor 200 reads this data via I/O port 210, as called for by block 320, at the times indicated by the DSYNC and SYNCO signal supplied to I/O port 230.

As image data is received, processor 200 keeps track of its maximum values, as called for by block 325. As called for by block 330, processor 200 then determines if this maximum value is greater than 90% of the saturation value for chip 100 and, if it is, proceeds to block 335. The latter block causes processor 200 to decrease the exposure value used by sensor 100 by a predetermined percentage, $E_D$, via lines EUP and ECLK, and then return to block 320 to repeat the above-described read operation. This procedure then continues as necessary until processor is able to meet the maximum exposure criteria imposed by block 330. With commonly encountered illumination levels it is likely that processor 200 will pass block 330 on its first attempt, thereby shortening the exposure adjustment phase of the reading process.

On reaching block 340, processor 200 determines if the maximum signal value is less than 40% of the saturation value and, if it is not, increases the exposure by a predetermined percentage. Eu, as called for by block 350. Processor 200 will then repeat its adjustments of the exposure value used by sensor 100 until the exposure criteria imposed by both of blocks 330 and 340 are met. When the latter condition occurs, image sensor 100 will be known to be using an exposure value within the acceptable exposure limits established by the program of processor 200.

Once processor 200 has completed the exposure adjustments called for by its program by exiting block 340, it leaves behind the preliminary acquisition phase of the reading process and enters into the final phase thereof. In the latter phase, processor 200 performs a final read operation, as called for by block 360, placing the results in memory, decodes the stored resulting data, as called for by block 365 and outputs the resulting alphanumeric data to an external data utilization device as called for by block 370. Because this final phase of the reading process does not form a part of the present invention it will not be described in detail herein.

The above-described example makes use only of the ability of the sensing control subsystem and its program to assume and exert control over the exposure value used by the sensing subsystem. As previously explained, this is because the WL 1070 image sensor so interlinks the frame rate and the frame size that the advantages to be gained by changing the one are offset by compensating changes in the other. With image sensors which allow these and other imaging parameters to be selected and changed independently, it is possible to bring these parameters also under the control of the stored program and thereby further increase the speed and accuracy of the reading process. An image sensor which makes available both interlaced and non-interlaced video formats and different frame sizes, for example, could be controlled to make its exposure adjustments while the image sensor operates in an interlaced format with a small frame size, and then be switched to a non-interlaced format with a larger frame size to achieve the high resolution desirable for a final read operation. It will therefore be understood that the present invention is not limited to any particular number or type of imaging parameters or to programs having any particular number or type of imaging criteria.

While the present invention has been described with reference to certain specific exemplary embodiments, the true spirit and scope of the present invention should be determined only with reference to the appended claims.

What is claimed is:

1. An optical reader for reading data from an indicia of the two dimensional type including, in combination:

an illumination system for directing light against said indicia;

an optical system for receiving light scattered from said indicia and forming said light into an image;

an image sensor circuit for receiving said image, for converting said image into a set of electrical signals and for processing said electrical signals in accordance with a plurality of sensor operating parameters to generate an image data signal that contains said data, said image sensor circuit comprising an integrated circuit including at least an on-chip two-dimensional array of picture elements, an on-chip timing control circuit, and an on-chip exposure control circuit and having a plurality of control inputs for receiving control signals for controlling said control circuits and an output for outputting said image data signal;

an image sensor control circuit including a data input for receiving said image data signal; a plurality of control outputs through which said control signals may be supplied to the control inputs of said image sensor circuit to interactively control said control circuits; and a stored program for determining the magnitudes of said sensor operating parameters, and for controlling the generation of said control signals in accordance with information derived from said image data signal to assure that said image data signal meets predetermined image quality standards.

2. An optical reader as set forth in claim 1 in which said image sensor circuit and said image sensor control circuit are each formed substantially on respective single substrates.

3. An optical reader as set forth in claim 1 in which said image sensor circuit further includes at least one output for outputting at least one status signal indicative of the current state of the image sensor circuit, in which said image sensor control circuit further includes at least one input for receiving said at least one status signal, and in which the operation of said program is also based in part on information derived from said at least one status signal.

4. An optical reader as set forth in claim 1 in which said image sensor circuit and said image sensor control circuit bear a master/slave relationship to one another.

5. An optical reader as set forth in claim 1 in which said image data signal has maximum and minimum values, and in which the image sensor control circuit adjusts said exposure time in a plurality of increments of predetermined magnitude to establish the desired relationship between the magnitude of the image data signal and said maximum and minimum values.

6. An optical reader as set forth in claim 1 in which said image sensor circuit includes a light responsive array of picture elements that are organized in rows and columns, in which image data may be read from said array in any one of a plurality of frame sizes having different respective numbers of rows and columns, and in which one of said sensor operating parameters comprises the frame size to be used in reading data from said array.

7. An optical reader as set forth in claim 6 in which data may be read from said array at any one of a relatively small number of discrete frame rates, and in which one of said sensor operating parameters comprises the frame rate to be used in reading data from said array.

8. An optical reader for reading data from an indicia of the two dimensional type including, in combination;

an illumination system for directing light against said indicia;

an optical system for receiving light scattered from said indicia and forming said light into an image of said indicia;

image sensing means for receiving said image, for converting said image into a set of electrical signals, and for processing said electrical signals in accordance with a plurality of mode control signals to generate an image data signal that contains said data, said image sensing means including at least a two-dimensional array of picture elements, a timing control circuit, and an exposure control circuit, and having a plurality of control inputs for receiving said mode control signals and thereby controlling said control circuits and an output for outputting said image data signal;

a programmable control circuit including a data input for receiving said image data signal, a plurality of outputs for outputting said mode control signals, and a stored program for controlling the generation of said mode control signals, said program storing at least one image quality criteria and being responsive to information derived from said image data signal to assure that said image sensing means and said programmable control circuit operate cooperatively and interactively to assure that said image data signal meets said at least one image quality criteria.

9. An optical reader as set forth in claim 8 in which said image sensing means and said programmable control circuit are each formed substantially on a single substrate.

10. An optical reader as set forth in claim 8 in which said image sensing means further includes circuitry for supplying to the programmable control circuit a status signal indicative of the current state of the image sensing means, and in which said programmable control circuit is programmed to utilize said status signal in generating said mode control signals.

11. An optical reader as set forth in claim 8 in which said programmable control circuit and said image sensing means bear a master/slave relationship to one another.

12. An optical reader as set forth in claim 8 in which said image data signal has maximum and minimum magnitudes, in which one of said image quality criteria comprises said image data signal having a magnitude bearing a predetermined relationship to said maximum and minimum magnitudes, and in which the programmable control circuit varies said exposure time in a plurality of increments of predetermined size to assure that the magnitude of the image data signal meets the requirements of said predetermined relationship.

13. An optical reader as set forth in claim 8 in which said image sensing means includes a light responsive array of picture elements that are organized into rows and columns, in which image data may be read from said array in any one of a plurality of frame sizes having different respective numbers of rows and columns, and in which one of said mode control signals comprises the frame size to be used in reading image data from said array.

14. An optical reader as set forth in claim 13 in which image data may be read from said array at any one of a plurality of different frame rates, and in which one of said mode control signals comprises the frame rate to be used in reading image data from said array.

15. An optical reader as set forth in claim 1 in which said image sensor circuit is an image sensor circuit of the type which, when active, captures images of said indicia one after another without substantial interruption.

16. An optical reader as set forth in claim 8 in which said image sensing means is an image sensor of the type which, when active, captures a plurality of successive images of said indicia without substantial interruption.

* * * * *